(12) United States Patent
Shimizu et al.

(10) Patent No.: US 10,876,991 B2
(45) Date of Patent: Dec. 29, 2020

(54) GAS SENSOR

(71) Applicant: NGK SPARK PLUG CO., LTD., Nagoya (JP)

(72) Inventors: Yasumitsu Shimizu, Kiyosu (JP); Takayuki Kito, Komaki (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 0 days.

(21) Appl. No.: 16/270,793

(22) Filed: Feb. 8, 2019

(65) Prior Publication Data

US 2019/0265189 A1 Aug. 29, 2019

(30) Foreign Application Priority Data

Feb. 28, 2018 (JP) .................. 2018-034455

(51) Int. Cl.
*G01N 27/407* (2006.01)
*G01N 27/406* (2006.01)

(52) U.S. Cl.
CPC ....... *G01N 27/407* (2013.01); *G01N 27/4067* (2013.01)

(58) Field of Classification Search
CPC ............ G01N 27/407; G01N 27/4067; G01N 27/4062; G01N 27/4071
See application file for complete search history.

(56) References Cited

U.S. PATENT DOCUMENTS

| 2011/0100815 A1* | 5/2011 | Mori ................. G01N 27/4075 204/426 |
| 2016/0202207 A1* | 7/2016 | Igarashi ............ G01N 27/4071 204/424 |
| 2017/0307478 A1* | 10/2017 | Oba .................... G01M 15/104 |
| 2017/0307560 A1* | 10/2017 | Oba ..................... G01N 27/409 |
| 2018/0038821 A1 | 2/2018 | Kojima et al. |

FOREIGN PATENT DOCUMENTS

| JP | 4897912 B2 | 3/2012 |
| JP | 2018-21821 A | 2/2018 |

\* cited by examiner

*Primary Examiner* — Alvaro E Fortich
*Assistant Examiner* — Zannatul Ferdous
(74) *Attorney, Agent, or Firm* — Sughrue Mion, PLLC (57) ABSTRACT

Disclosed is a stacked-type plate-shaped sensor element for detecting the concentration of a specific gas component in a gas under measurement. The sensor element includes: a first ceramic layer; a pair of measurement and reference electrodes stacked on a front end part of the first ceramic layer; a through hole formed through at least the first ceramic layer in a rear end side of the sensor element; a through hole conductor disposed on an inner wall of the through hole; a porous reference lead extending between the reference electrode and the through hole conductor; a gas-impermeable second ceramic layer arranged on the first ceramic layer to cover at least the reference lead; and a ventilation portion provided, in the form of a hollow space or a porous substance, between the first and second ceramic layers at a position facing the through hole and communicating with the reference lead.

4 Claims, 10 Drawing Sheets

GAS SENSOR

FIELD OF THE INVENTION

The present invention relates to a sensor element for detecting the concentration of a specific gas component in e.g. a combustion gas or exhaust gas of a combustion device, internal combustion engine or the like. The present invention also relates to a gas sensor equipped with the sensor element and a method of manufacturing the sensor element.

Hereinafter, the term "front" refers to a gas sensing side with respect to the direction of an axis of a gas sensor (sensor element); and the term "rear" refers to a side opposite the front side.

BACKGROUND OF THE INVENTION

There is conventionally used a gas sensor for detecting the concentration of a specific gas component such as oxygen in an exhaust gas of an internal combustion engine, which has installed therein a sensor element including a plate-shaped solid electrolyte body and at least a pair of electrodes arranged on the solid electrolyte body.

Figure 12:
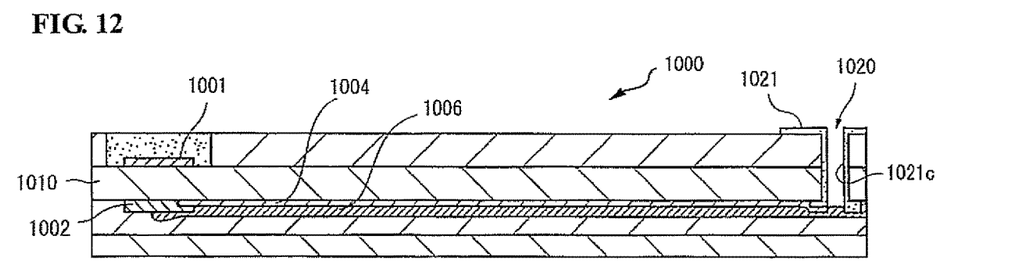
FIG. 12 is a cross-sectional view of a conventional sensor element.

Japanese Patent No. 4897912 (hereinafter abbreviated as "JP-B-4897912") discloses, as one example of the above conventional gas sensor, a gas sensor having a sensor element 1000 equipped with a solid electrolyte body 1010 and a pair of electrodes 1001 and 1002 as shown in FIG. 12 (also see FIG. 5 of JP-B-4897912). The electrode 1001 is adapted as a measurement electrode, whereas the electrode 1002 is located inside the sensor element 1000 and adapted as a reference electrode to take in oxygen through the solid electrolyte body 1010 as a reference gas for oxygen concentration detection. A reference lead 1004 is connected at one end thereof to the reference electrode 1002. In the sensor element 1000, oxygen is accumulated as reference oxygen in the reference electrode 1002 with the passage of a very small current between the measurement electrode 1001 and the reference electrode 1002. It is thus required that the reference electrode 1002 and the reference lead 1004 have not only conductivity but also porosity (oxygen permeability) to accumulate therein oxygen.

In the gas sensor of JP-B-4897912, the sensor element 1000 further includes: a porous layer 1006 formed to cover the reference lead 1004 and having higher gas permeability than that of the reference lead 1004; a through hole 1020 formed in a rear end side of the sensor element 1000; and a through hole conductor 1021c disposed on an inner wall of the through hole 1020 as shown in FIG. 12. The through hole conductor 1021c is connected to the other end of the reference lead 1004 so as to take out a reference voltage of the reference lead 1004 to an electrode pad 1021 via the through hole conductor 1021c. On the other hand, the porous layer 1006 is arranged facing the inside of the through hole 1020 so as to ensure oxygen permeability through the through hole 1020.

SUMMARY OF THE INVENTION

In the gas sensor of JP4897912B, however, the porous layer 1006 is stacked on the whole of the reference lead 1004 and on a part of the reference electrode 1002 to which the reference lead 1004 is connected so that the reference electrode 1002 is substantially in communication with the air (through hole 1020) through the porous layer 1006. For this reason, the reference voltage of the reference electrode 1002 is limited to a value on the basis of oxygen in the air. It has been difficult to set the oxygen concentration of the reference electrode 1002 higher than that of the air for various detection output designs of the sensor element 1000. In addition, the porous layer 1006 is relatively large in area whereby the sensor element 1000 is susceptible to improvement in strength.

Figure 13:
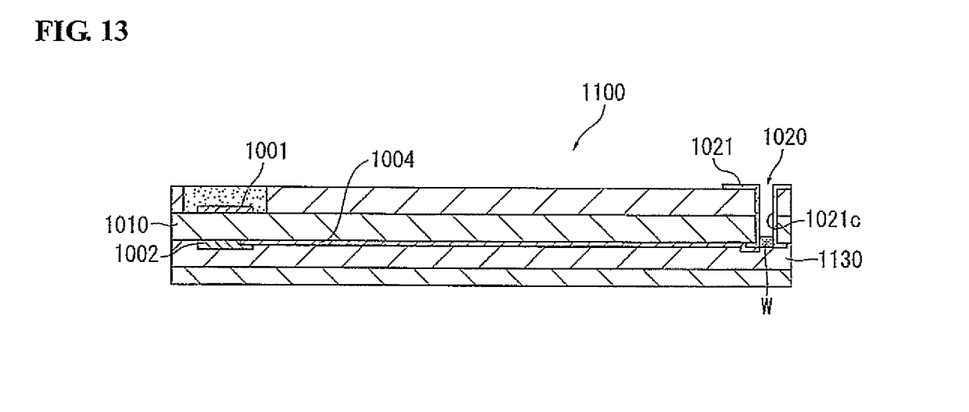
FIG. 13 is a cross-sectional view of another conventional sensor element.

As another example of the above conventional gas sensor, there is also known a gas sensor having a sensor element 1100 in which a gas-impermeable ceramic layer 1130 is directly stacked on the reference lead 1004 with no porous layer 1006 interposed therebetween as shown in FIG. 13. In the sensor element 1100, excessive oxygen in the reference electrode 1002 is discharged to the outside through the reference lead 1004, the through hole conductor 1021c and the through hole 1020. Since the reference lead 1004 is covered with the gas-impermeable ceramic layer 1130, the discharge rate of the oxygen is determined by the reference lead 1004. The oxygen concentration of the reference electrode 1002 is consequently maintained at a predetermined value higher than that of the air.

Figure 14:
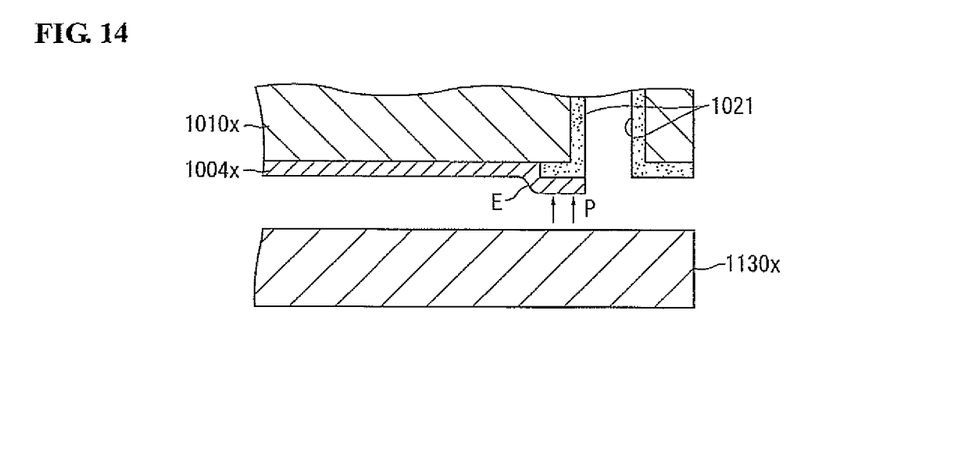
FIG. 14 is a schematic view showing a manufacturing method of the conventional sensor element of FIG. 13.

During manufacturing of the sensor element 1100, a conductive paste layer 1004x for formation of the reference lead 1004 is printed on a surface of the solid electrolyte body 1010 so as to overlap the through hole conductor 1021c; and a relatively hard green ceramic sheet 1130x for formation of the ceramic layer 1130 (hereinafter also referred to as "green ceramic layer 1130x") is stacked on the conductive paste layer 1004x as shown in FIG. 14. In this state, a part of the conductive paste layer 1004x overlapping the through hole conductor 1021c makes a direct contact P with the green ceramic layer 1130x. The through hole conductor 1021c and the conductive paste layer 1004x are hence compressed and deformed by the green ceramic layer 1130x. The thickness of the conductive paste layer 1004 is changed as the conductive paste layer 1004x is compressed and deformed by the green ceramic layer 1130x. Especially in the case where the green ceramic layer 1130x is brought into contact with an edge portion of the conductive paste layer 1004x printed on a corner portion of the through hole conductor 1021c, the corner portion of the through hole conductor 10210 and the edge portion of the conductive paste layer 1004x may be compressed and deformed to a significantly small thickness by the green ceramic layer 1130x. The reference lead 1004, when formed by firing such a conductive paste layer 1004, varies in oxygen permeability.

The output voltage between the electrodes 1001 and 1002 of the sensor element 1100 changes with variations in the oxygen permeability of the reference lead 1004. This results in an unstable gas detection output of the sensor element 1100.

Moreover, the sensor element 1100 in which the reference lead 1004 is located at the bottom of the through hole 1020 as shown in FIG. 13 has a problem that water W accumulated in the through hole 1020 is difficult to discharge from the vicinity of the reference lead 1004. The reference lead 1004 may be clogged with such accumulated water W to cause a deterioration of oxygen permeation. This also results in an unstable gas detection output of the sensor element 1100 due to changes in the output voltage of the sensor element 1100.

In view of the foregoing, it is an object of the present invention to provide a sensor element capable of setting the oxygen concentration of a reference electrode to a value different from that of the air and, at the same time, ensuring a stable gas detection output of the sensor element. It is also an object of the present invention to provide a gas sensor with the sensor element and a method of manufacturing the sensor element.

In accordance with a first aspect of the present invention, there is provided a stacked-type sensor element having a plate shape extending in an axis direction thereof and comprising: a first ceramic layer; a pair of electrodes stacked on a front end part of the first ceramic layer, one of the electrodes being a measurement electrode brought into contact with a gas under measurement to detect a specific gas component in the gas under measurement, the other of the electrodes being a reference electrode brought into contact with a reference gas; a through hole formed through at least the first ceramic layer in a rear end side of the sensor element and extending in a stacking direction of the sensor element; a through hole conductor disposed on an inner wall of the through hole; a porous reference lead electrically connected to the reference electrode and directly connected to the through hole conductor; and a gas-impermeable second ceramic layer arranged facing one surface of the first ceramic layer on which the reference electrode is stacked and covering at least the reference lead, wherein the sensor element further comprises a ventilation portion provided between the first ceramic layer and the second ceramic layer at a position facing the through hole and communicating with the reference lead, and wherein the ventilation portion is in the form of either a hollow space or a porous substance having a higher porosity than that of the reference lead.

In accordance with a second aspect of the present invention, there is provided a gas sensor, comprising: the stacked-type sensor element as described above; and a metal shell holding therein the sensor element.

In accordance with a third aspect of the present invention, there is provided a method of manufacturing the stacked-type sensor element as described above, comprising: forming a through hole through at least a green first ceramic layer in a rear end side of the sensor element such that the through hole extends in the stacking direction of the sensor element; forming a green through hole conductor on an inner wall of the through hole; forming a green lead on a reference electrode-side surface of the green first ceramic layer such that the green lead is electrically connected to the reference electrode and directly connected to the through hole conductor; stacking a green second ceramic layer on the reference electrode-side surface of the green first ceramic layer such that the green second ceramic layer covers at least the green lead; and firing the green lead, the green through hole conductor and the green first and second ceramic layers, thereby forming the green lead into the porous reference lead and forming the green second ceramic layer into the gas-impermeable second ceramic layer, wherein the manufacturing method further comprises, before the firing, providing a burn-off material or a porous substance between the green first ceramic layer and the green second ceramic layer at a position facing the through hole and communicating with the green lead, the burn-off material being a material capable of being burned off to form the hollow space during the firing step, the porous substance being higher in porosity than the reference lead.

In the above manufacturing method, the green lead and the green through hole conductor can be formed integral with each other in the same step for reduction in manufacturing process and improvement in manufacturing efficiency.

During the manufacturing of the sensor element, the green second ceramic layer of relatively high hardness is stacked on the conductive paste layer for formation of the reference lead. The through hole conductor and a part of the conductive paste layer in the vicinity of the through hole conductor may be hence compressed and deformed by the green second ceramic layer. In the present invention, however, the material of the ventilation portion is provided on a surface of the conductive paste layer in the vicinity of the through hole conductor so as to avoid direct contact of the green second ceramic layer with the through hole conductor and the conductive paste layer. The through hole conductor and the conductive paste layer are thus prevented from being compressed and deformed to a smaller thickness than the material of the ventilation portion. The reference lead, when formed by firing the conductive paste layer, does not vary in oxygen permeability so that the gas detection output of the sensor element does not become unstable due to variations in the oxygen permeability of the reference lead. Further, the reference lead is exposed to and in communication with the ventilation portion so that oxygen can be reliably discharged from the reference lead to the through hole through the ventilation portion. This makes it possible to set the oxygen concentration of the reference electrode to a value different from the oxygen concentration of the air and to ensure the stable gas detection output of the sensor element.

In the presence of the ventilation portion, the bottom of the through hole in the vicinity of the reference lead is increased in diameter and internal volume so that water entering in the ventilation portion or the reference lead can be easily discharged to the outside through the through hole. The reference lead is thus prevented from being clogged with such entering water to cause a deterioration of oxygen permeation. This also makes it possible to ensure the stable gas detection output of the sensor element.

The other objects and features of the present invention will also become understood from the following description.

DESCRIPTION OF EMBODIMENTS

A gas sensor 1 according to the first embodiment of the present invention will be first explained below with reference to FIGS. 1 to 5.

Figure 1:
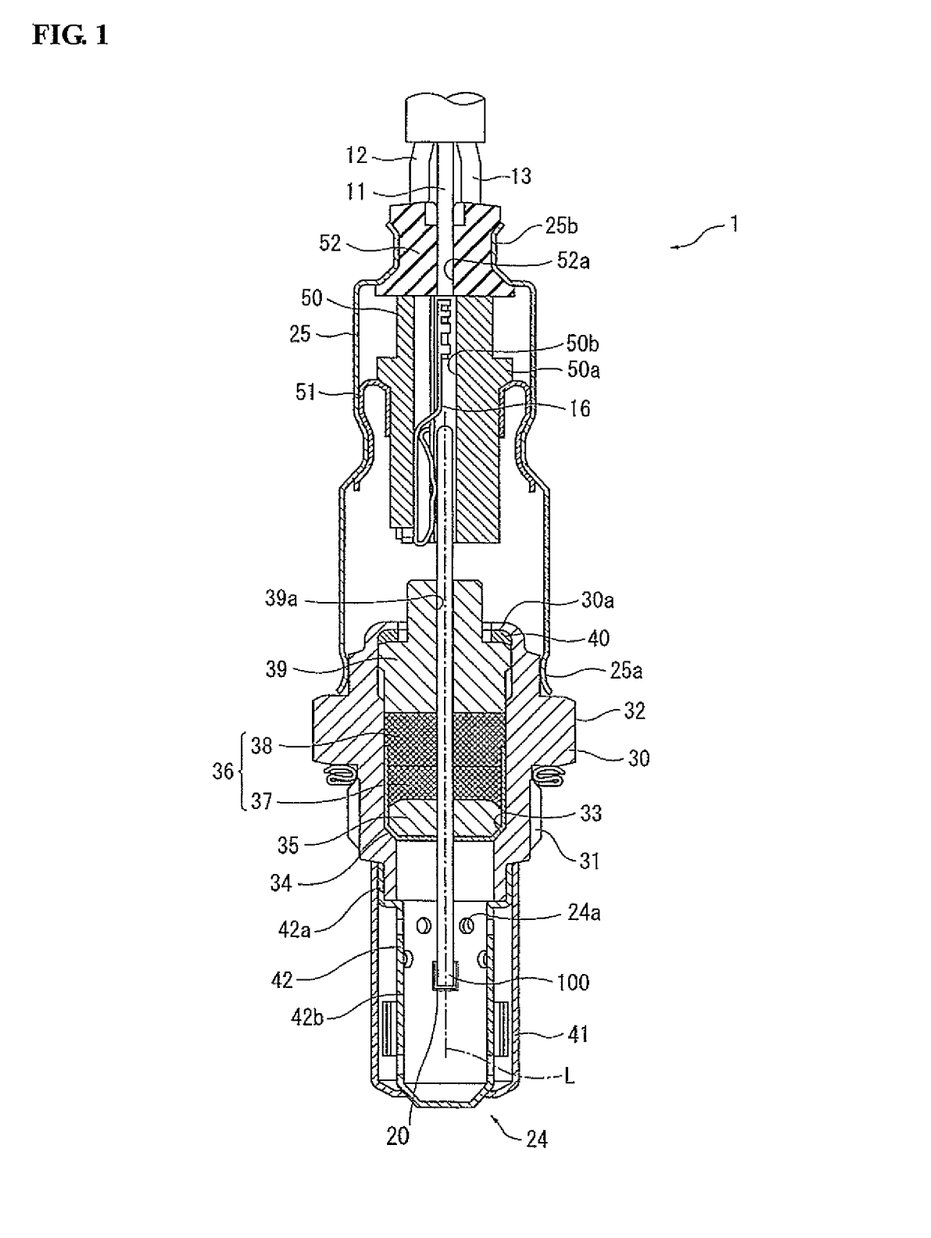
FIG. 1 is a cross-sectional view of a gas sensor (as an oxygen sensor) with a sensor element according to a first embodiment of the present invention.

FIG. 1 is a cross-sectional view of the gas sensor 1 as taken along the direction of an axis L thereof (also referred to as "longitudinal direction" or "axis direction"). In the first embodiment, the gas sensor 1 is configured as an oxygen sensor. Referring to FIG. 1, the gas sensor 1 includes: a stacked-type sensor element 100 having a rectangular plate shape extending in the direction of the axis L; a metal shell 30 holding therein the sensor element 100; and a protector 24 fitted on a front end portion of the metal shell 30. A porous protection layer 20 is formed to cover the entire circumference of a front end part of the sensor element 100.

Figure 2:
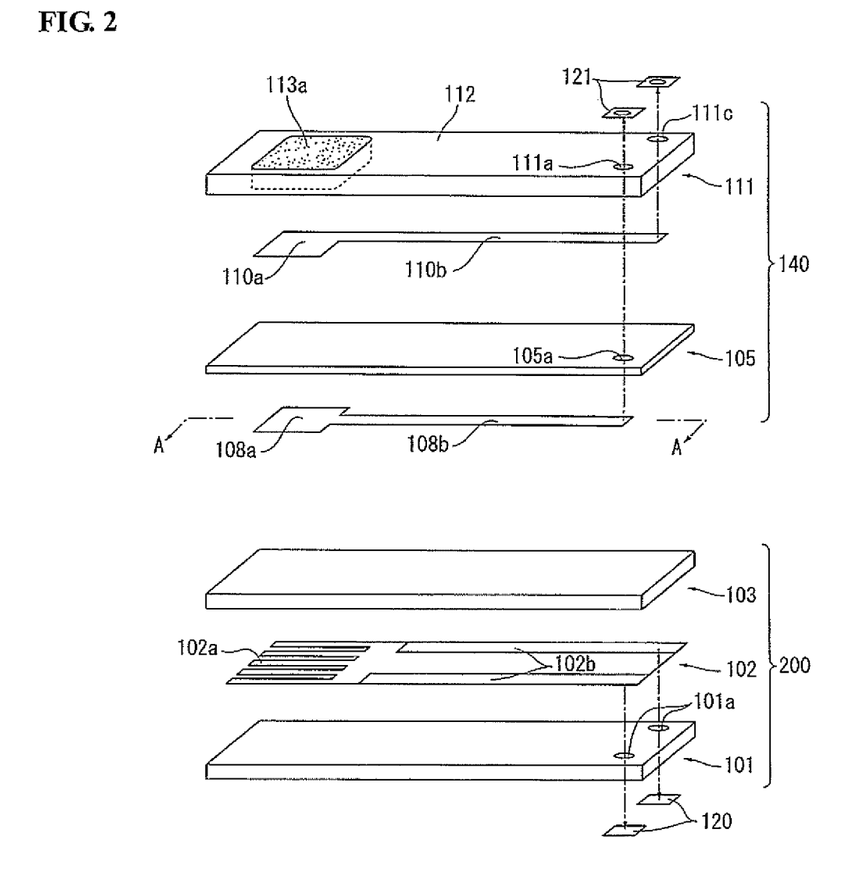
FIG. 2 is an exploded perspective view of the sensor element of FIG. 1.

FIG. 2 is an exploded perspective view of the sensor element 100. Referring to FIG. 2, the sensor element 100 has a single-cell structure that includes an oxygen concentration detection cell 140 and a heater 200 stacked on the oxygen concentration detection cell 140.

The heater 200 has first and second substrates 101 and 103 each predominantly composed of alumina etc. and a heating body 102 sandwiched between the first and second substrates 101 and 103 and made predominantly composed of platinum etc. The heating body 102 includes a heating portion 102a located on a front end side thereof and a pair of heater leads 102b extending from the heater portion 102a in a longitudinal direction of the first substrate 101 (i.e. in the direction of the axis L). Heater-side through holes 101a are formed in a rear end part of the first substrate 101. Conductors (not shown) are disposed on inner walls of the respective heater-side through holes 101a so as to electrically connect rear terminal ends of the heater leads 102b to heater-side pads 120.

The oxygen concentration detection cell 140 has a rectangular plate-shaped solid electrolyte body 105 and a pair of measurement and reference electrodes 110a and 108a stacked on opposite surfaces of the solid electrolyte body 105.

As shown in FIG. 2, the sensor element 100 further includes: a measurement lead 110b extending in a longitudinal direction of the solid electrolyte body 105 and electrically connected to the measurement electrode 110a; and a reference lead 108b extending in the longitudinal direction of the solid electrolyte body 105 and electrically connected to the reference electrode 108a. A protection layer 111 is formed to cover the measurement electrode 110a and the measurement lead 110b.

A first through hole 111c is formed in a rear end part of the protection layer 111; and a conductor is disposed on an inner wall of the first through hole 111c so as to electrically connect the measurement lead 110b to a sensor element-side pad 121. A second through hole 105a and a third through hole 111a are respectively formed in rear end parts of the solid electrolyte body 105 and the protection layer 111; and a through hole conductor 121e is disposed on inner walls of the second and third through holes 105a and 111a (see also FIG. 3) so as to electrically connect the reference lead 108b to a sensor element-side pad 121.

In the first embodiment, the solid electrolyte body 105 is in the form of a sintered body of partially stabilized zirconia in which yttria ($Y_2O$) or calcia ($CaO$) is added to zirconia ($ZrO_2$). With the passage of a very small current between the electrodes 108a and 110a of the oxygen concentration detection cell 140, oxygen is permeated through the solid electrolyte body 105 and accumulated as a reference gas in the reference electrode 108.

Herein, the solid electrolyte body 105 corresponds to the claimed first ceramic layer. The first ceramic layer is not limited to a layer entirely formed of solid electrolyte as in the first embodiment. The first ceramic layer may alternatively be a composite ceramic layer having a solid electrolyte part on which the measurement electrode 110a and the reference electrode 108a are arranged and a frame-shaped insulating ceramic part surrounding the solid electrolyte part. Further, the second through hole 105a and the third through hole 111a correspond to the claimed through hole; and the second substrate 103 corresponds to the claimed second ceramic layer.

Each of the measurement electrode 110a and the reference electrode 108a is formed of a composition containing a noble metal as a predominant component together with a ceramic material. The noble metal can be a platinum group metal. Preferable examples of the platinum group metal are Pt, Rh and Pd. These noble metals can be used solely or in combination of two or more thereof. In terms of adhesion, the ceramic material is preferably of the same kind as the predominant ceramic material of the part (e.g. solid electrolyte body 105) on which the electrode 110a, 108a is stacked.

Each of the measurement lead 110b and the reference lead 108b is also formed of a composition containing a noble metal as a predominant component. It is preferable that the measurement lead 110b and the reference lead 108b are denser (lower in porosity) than the measurement electrode 110a and the reference electrode 108a. The measurement lead 110b is not necessarily porous, whereas the reference lead 108b is essentially porous to show oxygen permeability. For these reasons, the reference lead 108b can contain, together with the noble metal, a ceramic material in an amount larger than the amount of the ceramic material contained in the reference electrode 108a.

Each of the heating body 102, the heater-side pads 120 and the sensor element-side pads 121 can be faulted of a platinum group metal.

In terms of heat resistance and oxidation resistance, it is preferable that the heating body 102, the measurement electrode 110a, the reference electrode 108a, the heater-side pads 120 and the sensor element-side pads 121 each contain Pt as a predominant component. It is further preferable that the heating body 102, the measurement electrode 110a, the reference electrode 108a, the measurement lead 110b, the reference lead 108b, the heater-side pads 120 and the sensor element-side pads 121 each contain a ceramic material in addition to the predominant platinum group metal component.

The protection layer 111 is formed on the surface of the solid electrolyte body 105 so as to sandwich the measurement electrode 110a and the measurement lead 110b between the protection layer 111 and the solid electrolyte body 105. In the first embodiment, the protection layer 111 includes: an electrode protecting portion 113a provided in porous form over the measurement electrode 110a to protect the measurement electrode 110a from poisoning; and a reinforcing portion 112 provided over the measurement lead 110b to protect the solid electrolyte body 105.

Referring back to FIG. 1, the metal shell 30 is made of SUS 430 etc. and has, formed on an outer circumferential surface thereof, a male thread portion 31 for mounting the gas sensor 1 to e.g. an exhaust pipe of a combustion device, internal combustion engine or the like; a hexagonal portion 32 enablable with a sensor mounting tool at the time of mounting of the gas sensor 1. The metal shell 30 also has, funned on an inner circumferential surface thereof, a shell-side step portion 33 protruding radially inwardly to retain thereon a metal holder 34 for holding the sensor element 100.

A ceramic holder 35 and a talc 36 are disposed in the metal holder 34 in this order from the front side. In the first embodiment, the talc 36 includes a first talc part 37 disposed inside the metal holder 34 and a second talc part 38 disposed in and over a rear end of the metal holder 34. The first talc part 37 is compressed and filled in the metal holder 34 so as to hold the sensor element 100 in position within the metal holder 34. The second talc part 38 is compressed and filled in the metal shell 30 so as to ensure the seal between the outer surface of the sensor element 100 and the inner surface of the metal shell 30. A sleeve 39 of alumina etc. is disposed on a rear end side of the second talc part 38. This sleeve 39 has a multi-stepped cylindrical shape, with an axial hole 39a formed therein along the axis L, so that the sensor element 100 is inserted through the axial hole 39a of the sleeve 39. A rear end 30a of the metal shell 30 is crimped radially inwardly to push the sleeve 39 toward the front end of the metal shell 30 via a ring member 40 of stainless steel etc.

The protector 24 is made of a metal material, with a plurality of gas introduction holes 24a formed therein, and is fitted on the front end portion of the metal shell 30 so as to surround the front end part of the sensor element 100 protruding from the metal shell 30. In the first embodiment, the protector 24 has a double-layer structure consisting of a bottomed cylindrical-shaped outer protector member 41 constant in outer diameter and a bottomed cylindrical-shaped inner protector member 42 disposed in the outer protector member 41 and having a rear end portion 42a made larger in outer diameter than a front end portion 42b thereof.

An outer tube 25 of SUS 430 etc. is fitted at a front end portion 35a thereof onto a rear end portion of the metal shell 30. The front end portion 25a of the outer tube 25 is increased in diameter toward the front and fixed to the metal shell 30 by laser welding or the like. A separator 50 is disposed in a rear end portion of the outer tube 25. A holding member 51 is fixed between the separator 50 and the outer tube 25 by radially inwardly crimping the outer tube 25 with the holding member 51 engaged on a protruding portion 50a of the separator 50.

An insertion hole 50b is formed through the separator 50 in the axis direction. Leads 11 to 14 for the oxygen concentration detection cell 140 and the heater 200 are inserted in the insertion hole 50b (although the lead 14 is not shown in the drawings). Connection terminals 16 are also inserted in the insertion hole 50b for electrical connection of the leads 11 to 14 to the sensor element-side pads 121 of the oxygen concentration detection cell 140 and to the heater-side pads 120 of the heater 200. The leads 11 to 14 are connected at rear terminal ends thereof to a connector (not shown) at positions outside the gas sensor 1 so as to allow input and output of electrical signals between the leads 11 to 14 and external equipment (such as ECU) via the connector. Although not specifically shown in the drawings, each of the leads 11 to 14 has a conductor wire covered with an insulating coating of resin.

Further, a substantially cylindrical column-shaped rubber cap 52 is disposed on a rear end side of the separator 50 so as to close an open rear end portion 25b of the outer tube 25. The rubber cap 52 is fixed to the outer tube 25 by radially inwardly crimping the outer tube 25 with the rubber cap 52 fitted in the rear end portion 25b of the outer tube 25. An insertion hole 52a is formed through the rubber cap 52 in the axis direction for insertion of the leads 11 to 14 therethrough.

Figure 3:
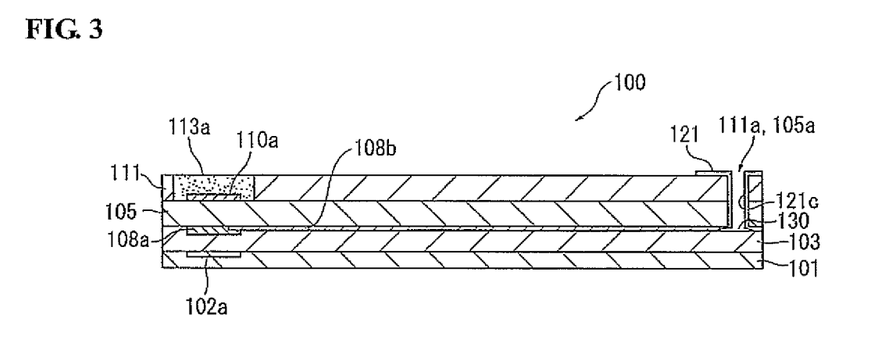
FIG. 3 is a cross-sectional view of the sensor element as taken along line A-A of FIG. 2.
Figure 4:
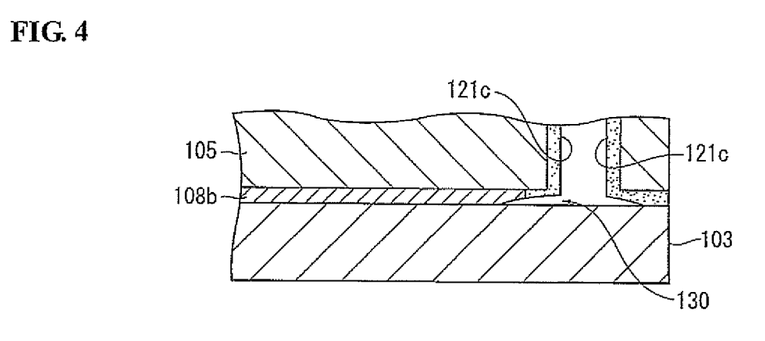
FIG. 4 is an enlarged view of part of FIG. 3.

The characteristic configuration of the sensor element 100 in the vicinity of the reference lead 108a and the through hole 105a, 111a will be now explained in detail below. FIG. 3 is a cross-sectional view of the sensor element 100 as taken along line A-A of FIG. 2 (i.e. along a plane parallel to the direction of the axis L and to the stacking direction of the sensor element 100). FIG. 4 is an enlarged view of part of FIG. 3.

As shown in FIG. 3, the reference lead 108b is arranged to extend along the direction of the axis L in contact with one surface (heater 200-side surface) of the solid electrolyte body 105. A front terminal end of the reference lead 108b overlaps and is electrically connected to a rear end portion of the reference electrode 108, whereas a rear terminal end of the reference lead 108b is directly connected to the through hole conductor 121c that is disposed on the inner walls of the second and third through holes 105a and 111a.

There is a hollow space 130 formed between the solid electrolyte body 105 and the second substrate 103 such that the hollow space 130 faces the second and third through holes 105a and 111a and communicates with the reference lead 108b as shown in FIGS. 3 and 4. More specifically, the hollow space 130 extends along the direction of the axis L across the inner walls of the second and third through holes 105a and 111a and passes through the through hole conductor 121c. Further, the hollow space 130 spreads from the bottom of the second through hole 105a (i.e. the second substrate 103) toward the solid electrolyte body 105 in a substantially conical shape approximately coaxial with the second and third through holes 105a and 111a. This hollow space 130 corresponds to the claimed ventilation portion in the first embodiment.

One side (second substrate 103-side; lower side in FIG. 4) of the rear terminal end of the reference lead 108b is located apart from the second substrate 103 in the stacking direction and is exposed to define a part of the hollow space 130.

The expression "the hollow space 130 communicates with the reference lead 108b" as used herein means that the hollow space 130 is in communication with (arranged to abut on) the reference lead 108b but is not in direct communication with the reference electrode 108a. It is because, if the hollow space 130 is in direct communication with the reference electrode 108a, the oxygen concentration of the reference electrode 108a becomes equal to the oxygen concentration of the air and cannot be set to a value different from the oxygen concentration of the air.

There is no particular limitation on the length of communication of the hollow space 130 with the reference lead 108b in the direction of the axis L. If the communication length is too long, however, the strength of the sensor element 100 is lowered. For this reason, it is preferable that the hollow space 130 is in communication with only a part of the reference lead 108b. It is more preferable that the hollow space 130 is in communication with only a rear terminal end region of the reference lead 108b.

As will be discussed in detail later, a conductive paste as a material for formation of the reference lead 108b is applied; and a relatively hard green ceramic layer (or sheet) as a material for formation of the second substrate 103 is stacked on the applied conductive paste layer during manufacturing of the sensor element 100. In this state, the through hole conductor 121c and a part of the conductive paste layer in the vicinity of the through hole conductor 121c may be compressed and deformed by the green ceramic layer. In view of such a problem, a burn-off material for formation of the hollow space 130 is provided on a surface of the conductive paste layer in the vicinity of the through hole conductor 121c so as to avoid direct contact of the green ceramic layer (second substrate 103) with the through hole conductor 121c and the conductive paste layer (reference lead 108b) in the first embodiment. The through hole conductor 121c and the conductive paste layer (reference lead 108b) are thus prevented from being compressed and deformed by the green ceramic layer (second substrate 103) to a smaller thickness than the burn-off material. As a consequence, the gas detection output of the sensor element 100 does not become unstable due to variations in the oxygen permeability of the reference lead 108b. Further, the reference lead 108b is exposed to and in communication with the hollow space 130 so that the oxygen can be reliably discharged from the reference lead 108b to the through hole 105a, 111a through the hollow space 130. This makes it possible to set the oxygen concentration of the reference electrode 108a to a value different from the oxygen concentration of the air and to ensure the stable gas detection output of the sensor element 100.

The thickness of the hollow space 130 can be set to any value greater than 0 (zero) in the first embodiment. In terms of oxygen permeability, the thickness of the hollow space 130 is 1 µm or larger.

In the presence of the hollow space 130, the bottom of the through hole 105a (in the vicinity of the reference lead 108b) is increased in diameter and internal volume so that water entering in the hollow space 130 or the reference lead 108b can be easily discharged to the outside through the through hole 105a, 111a. The reference lead 108b is thus prevented from being clogged with such entering water to cause a deterioration of oxygen permeation. This also makes it possible to ensure the stable gas detection output of the sensor element 100.

A manufacturing method of the sensor element 100 will be next explained below. FIGS. 5A to 5F are schematic views showing one example of the manufacturing method of the sensor element 100.

Figure 5A:
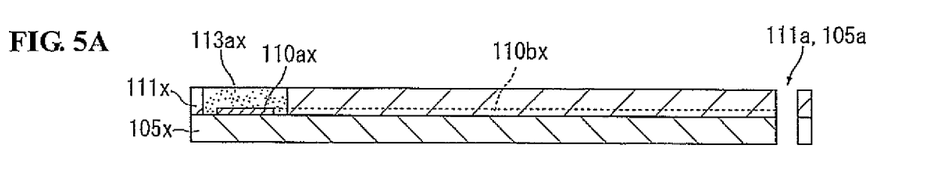
FIGS. 5A to 5F are schematic views showing a manufacturing method of the sensor element according to the first embodiment of the present invention.

A green (unfired) solid electrolyte body 105x is provided as a material of the solid electrolyte body 105. As shown in FIG. 5A, a conductive paste layer 110ax for formation of the measurement electrode 110a and a conductive paste layer 110bx for formation of the measurement lead 110b are printed onto one surface (upper side in FIG. 5A) of the green solid electrolyte body 105x. A green ceramic sheet 111x as a material for formation of the protection layer 111 (hereinafter also referred to as "green protection layer 111x") is stacked on the one surface of the green solid electrolyte body 105x so as to overlap and cover the conductive paste layers 110ax and 110bx. In the first embodiment, the green protection layer 111x includes a green electrode protecting portion 113ax to be formed into the electrode protecting portion 113a as shown in FIG. 5A.

Further, the first through hole 111c is formed through the green protection layer 111x in the stacking direction; and the second and third through holes 105a and 111a are formed through the green solid electrolyte body 105x and the green protection layer 111x in the stacking direction. (This step is referred to as a "through hole forming step".)

Figure 5B:
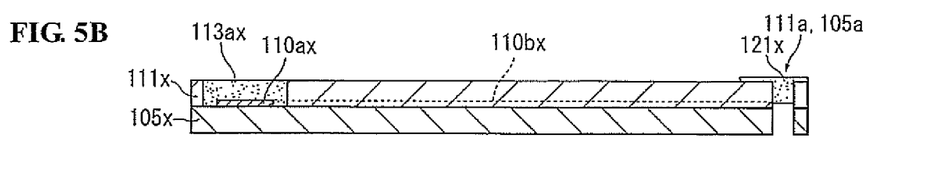
Figure 5C:
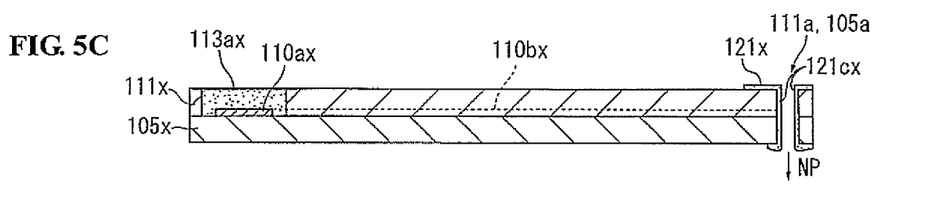

As shown in FIG. 5B, a conductive paste 121x for formation of the detection element-side pad 121 is fed and charged into the through holes 111a and 111e from the green protection layer 111x side such that parts of the through holes 111a and 111c are filled with the conductive paste 121x. As shown in FIG. 5C, a negative pressure NP is applied from the green solid electrolyte body 105x side so as to flow (suck) the conductive paste 121x through the through holes 105a and 111a to the other surface (lower side in FIG. 5C) of the green solid electrolyte body 105x. Under suction by the negative pressure NP, the conductive paste 121x projects from the through hole 105a and becomes spread over a part of the other surface of the green solid electrolyte body 105x around the through hole 105a. There is thus formed a green through hole conductor 121cx along with a green sensor element-side pad 121x. (This step is referred to as a "green through hole conductor forming step".) Although not relevant to the present invention, a green through hole conductor in the first through hole 111c is formed along with a green sensor element-side pad 121x by feeding a conductive paste in the first through hole 111c of the green protection layer 111x before the stacking of the green protection layer 111x on the green solid electrolyte body 105x.

Figure 5D:
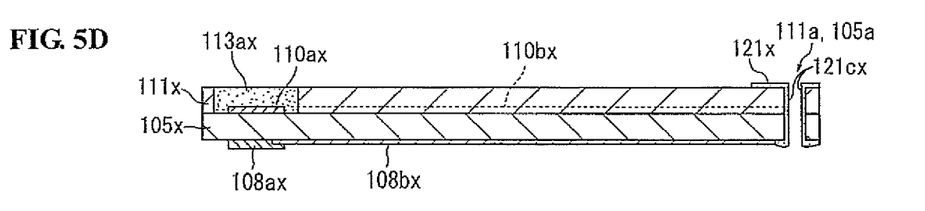

As shown in FIG. 5D, conductive pastes 108ax and 108bx for formation of the reference electrode 108a and the reference lead 108b are printed onto the other surface of the green solid electrolyte body 105x. (This step is referred to as a "green lead forming step".) In the first embodiment, the green lead forming step is performed after the green through hole conductor forming step of FIGS. 5B and 5C. At this time, the conductive paste 108bx is applied such that a rear end of the applied conductive paste 108bx (as a green lead) overlaps and makes electrical connection to a part of the green through hole conductor 121cx spread on the other surface of the green solid electrolyte body 105x.

Figure 5E:
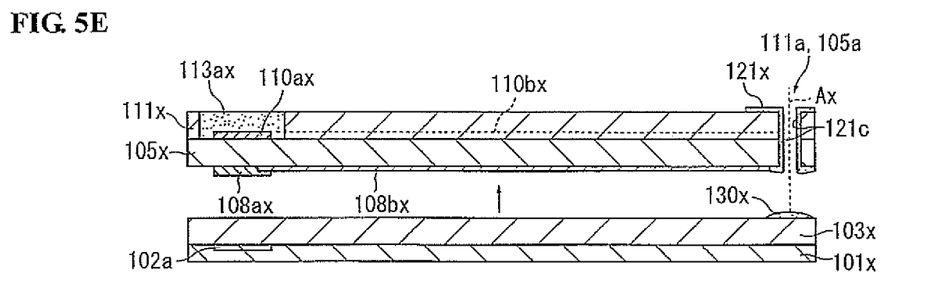

On the other hand, green ceramic sheets 101x and 103x as materials for formation of the first and second substrates 101 and 103 (hereinafter also respectively referred to as "green first and second substrates 101x and 103x") are stacked together, with a conductive paste layer 102ax for formation of the heating portion 102a being applied between the green first and second substrates 101x and 103x, as shown in FIG. 5E.

A burn-off material 130x is then printed in a dome-like shape on one surface (upper side in FIG. 5E) of the green second substrate 103x so as to be located at a position centered on the center axis Ax of the through hole 105a, 111a with a larger diameter than the diameter of the through hole 105a, 111a (i.e. at a position facing the through hole 105a, 111a and brought into contact with the conductive paste 108bx (green lead)).

Figure 5F:
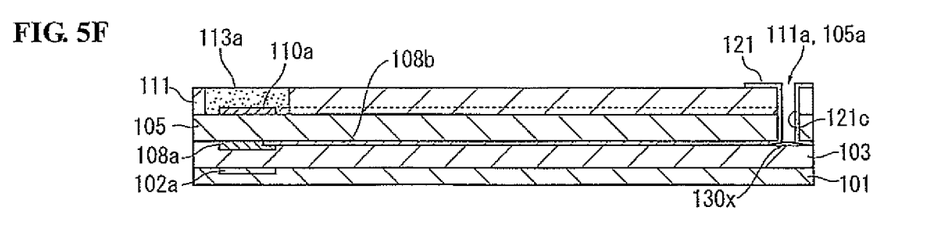

The resulting green substrate assembly is stacked on the other surface of the green solid electrolyte body 105x such that the green second substrate 103x faces the green solid electrolyte body 105x and covers at least the conductive paste 108bx (green lead) as shown in FIG. 5F. (This step is referred to as a "stacking step".) During the stacking step, the conductive pastes 108bx and 121x are pressed by the burn-off material 130x and recessed toward the green protection layer 111x side because the metal-containing conductive pastes 108bx and 121x are softer than the burn-off material 130x.

Finally, the whole of the thus-obtained stacked assembly (including the green lead 108bx and the green second substrate 103) is fired. (This step is referred to as a "firing step".) During the firing step, the respective sensor element parts 105, 110a, 110b, 111, 121c, 108a, 108b, 101, 103 and 102a are respectively formed by firing the corresponding materials 105x, 110ax, 110bx, 111x, 121cx, 108ax, 108bx, 101x, 103x and 102ax; and the burn-off material 130x is burned off to form the hollow space 130. With this, the sensor element 100 is completed as shown in FIGS. 3 and 4.

The green lead forming step of FIG. 5D may be carried out before the green through hole conductor forming step of FIGS. 5B and 5C. In such a case, the conductive paste 108*bx* is applied such that a rear end of the applied conducive paste 108*bx* (as a green lead) extends to a part of the other surface of the green solid electrolyte body 105*x* adjacent to a peripheral edge of the through hole 105*a* in the green lead forming step. This allows the green through hole conductor 121*cx*, when spread on the other surface of the green solid electrolyte body 105*x* with the application of a negative pressure NP in the green through hole conductor forming step, to overlap and make connection to the rear end of the applied conductive paste 108*bx* (green lead).

The burn-off material 130*x* may be applied to the solid electrolyte body 105*x* side, rather than to the green second substrate 103*x* side, in the stacking step of FIGS. 5E and 5F. As the burn-off material 130*x*, there can be used any material (such as carbon material) capable of being burned off at a temperature of 1000° C. or lower during the firing step.

Figure 6:
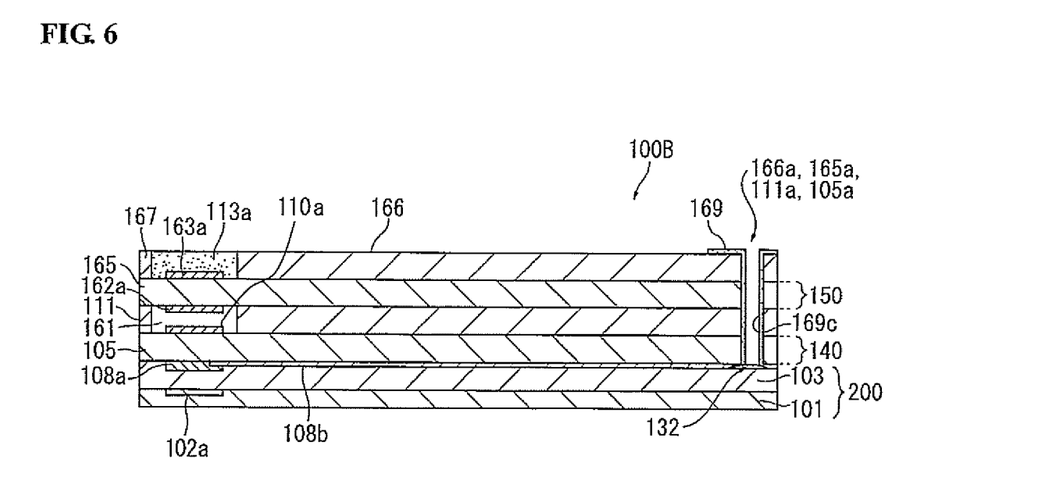
FIG. 6 is a cross-sectional view of a sensor element according to a second embodiment of the present invention.
Figure 7:
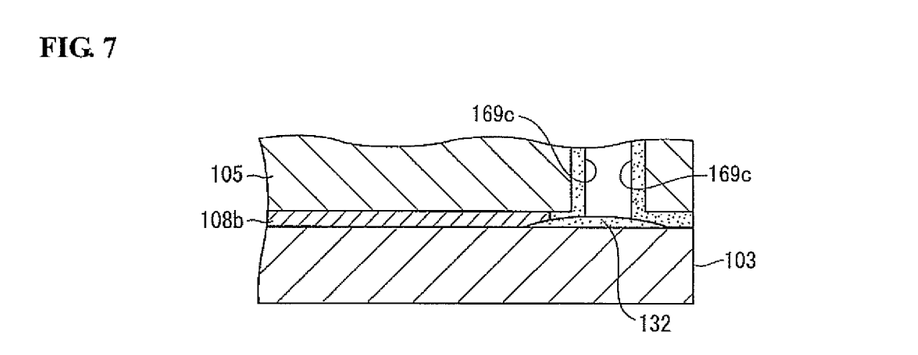
FIG. 7 is an enlarged view of part of FIG. 6.

A gas sensor according to the second embodiment of the present invention will be next explained below with reference to FIGS. 6 and 7. The gas sensor according to the second embodiment is structurally similar to the gas sensor 1 according to the first embodiment except for the configuration of a sensor element 100B. The following explanations will be thus focused on the sensor element 100B. FIG. 6 is a cross-sectional view of the sensor element 100B as taken along the direction of the axis L (as corresponding to FIG. 3). FIG. 7 is an enlarged view of part of FIG. 6.

As shown in FIG. 6, the sensor element 100B has a two-cell structure that includes an oxygen concentration detection cell 140, a heater 200 stacked on one side of the oxygen concentration detection cell 140 and an oxygen pumping cell 150 stacked on the other side of the oxygen concentration detection cell 140 opposite from the heater 200. Since the structures of the oxygen concentration detection cell 140 and the heater 200 in the second embodiment are similar to those in the first embodiment, explanations of the oxygen concentration detection cell 140 and the heater 200 will be omitted herefrom.

The oxygen pumping cell 150 has a rectangular plate-shaped solid electrolyte body 165, a pair of first and second pumping electrodes 162*a* and 163*a* stacked on opposite surfaces of the solid electrolyte body 165, and leads (not shown) electrically connected to the first and second pumping electrodes 162*a* and 163*a* and extending in a longitudinal direction of the solid electrolyte body 165. There is a substantially rectangular measurement space 161 formed in a front end part of the protection layer 111. Herein, the formation of the measurement space 161 in the second embodiment corresponds to a modification of the first embodiment by removal of the electrode protecting portion 113*a* from the sensor element 100.

The first pumping electrode 162*a* is located on one surface (lower side in FIG. 6) of the solid electrolyte body 165 facing the oxygen concentration detection cell 140 and is exposed to the inside of the measurement space 161. The measurement electrode 110*a* is also exposed to the inside of the measurement space 161. The first pumping electrode 162*a* and the measurement electrode 110*a* are opposed to each other within the measurement space 161.

On the other hand, the second pumping electrode 163*a* is located on the other surface (upper side in FIG. 6) of the solid electrolyte body 165 opposite and facing away from the oxygen concentration detection cell 140.

A protection layer 167 is formed to cover the second pumping electrode 163*a* and the lead connected thereto. As in the case of the protection layer 111 formed in the sensor element 100 of the first embodiment, the protection layer 167 includes: an electrode protecting portion 113*a* provided in porous form over the second pumping electrode 163*a* to protect the second pumping electrode 163*a* from poisoning; and a reinforcing portion 166 provided over the lead to protect the solid electrolyte body 165.

A fourth through hole 165*a* and a fifth through hole 166*a* are respectively formed through rear end parts of the solid electrolyte body 165 and the protection layer 167; and a through hole conductor 169*c* is disposed on inner walls of the second through hole 105*a* (see FIG. 2) of the solid electrolyte body 105, the third through hole 111*a* (see FIG. 2) of the protection layer 111, the fourth through hole 165*a* of the solid electrolyte body 165 and the fifth through hole 166*a* of the protection layer 167 so as to electrically connect a rear terminal end of the reference lead 108*b* to a sensor element-side pad 169.

Although not specifically shown in the drawings, two other through holes are respectively formed in the solid electrolyte body 165 and the protection layer 167; and through hole conductors are disposed on inner walls of these through holes so as to electrically connect rear terminals of the leads for the first and second pumping electrodes 162*a* and 163*a* to sensor element-side pads 169. In the second embodiment, the second through hole 105*a*, the third through hole 111*a*, the fourth through hole 165*a* and the fifth through hole 166*a* correspond to the claimed through hole.

In the sensor element 100B, the direction and magnitude of current flowing between the electrodes 162*a* and 163*a* of the oxygen pumping cell 150 are adjusted such that the voltage (electromotive force) developed between the electrodes of the oxygen concentration detection cell 140 becomes constant at a predetermined value (e.g. 450 mV). The sensor element 100B is hence configured to detect the oxygen concentration of the gas under measurement linearly according to the current flowing in the oxygen pumping cell 150.

As shown in FIG. 7, there is a porous substance 132 provided between the solid electrolyte body 105 and the second substrate 103 in the sensor element 100B such that the porous portion 132 faces the second and third through holes 105*a* and 111*a* and communicates with the reference lead 108*b*. This porous substance 132 corresponds to the claimed ventilation portion in the second embodiment in place of the hollow space 130 in the first embodiment. In the second embodiment, the porous substance 132 has a dome-like shape convex from the second substrate 103 toward the solid electrolyte body 105.

The porous substance 132 is higher in porosity (higher in gas permeability) than the reference lead 108*b* so that oxygen can be easily discharged from the reference lead 108*b* to the outside (through hole) through the porous substance 132. For example, the porous substance 132 is formed of porous alumina by applying a paste containing ceramic particles of alumina and burn-off particles of carbon etc. as a pore-forming material to a predetermined position, firing the applied paste and thereby burning off the carbon particles during manufacturing of the sensor element 100B. The porosity can be determined by observing a cross section of the sensor element with a scanning electron microscope (SEM) and analyzing the thus-obtained SEM image.

In the second embodiment, the porous substance 132 (pore-forming material) is provided on a surface of the conductive paste layer (as a green reference lead) in the vicinity of the through hole conductor 121c during manufacturing of the sensor element 100B. The through hole conductor 121c and the part of the conductive paste layer (reference lead 108b) in the vicinity of the through hole conductor 121cx are thus prevented from being compressed and deformed by the green second substrate 103x to a smaller thickness than the porous substance 132 (pore-forming material). As a consequence, the gas detection output of the sensor element 100B does not become unstable due to variations in the oxygen permeability of the reference lead 108. Further, the reference lead 108b is exposed to and in communication with the porous substance 132 so that oxygen can be reliably discharged from the reference lead 108b to the through hole through the porous substance 132. This makes it possible to set the oxygen concentration of the reference lead 108b to a value different from that of the air and to ensure the stable gas detection output of the sensor element 100B.

In the second embodiment, the thickness of the porous substance 132 can be set to any value greater than 0 (zero). In terms of oxygen permeability, the thickness of the porous substance 132 is 1 μm or larger.

In the presence of the porous substance 132, the bottom of the through hole 105a (in the vicinity of the reference lead 108b) is increased in diameter and internal volume so that water entering the porous substance 132 or the reference lead 108b can be easily discharged from the porous substance 132 to the outside through the through hole 105a, 111a. The reference lead 108b is thus prevented from being clogged with such entering water to cause a deterioration of oxygen permeation. This also makes it possible to ensure the stable gas detection output of the sensor element 100B.

Although the present invention has been described with reference to the above embodiments, the above embodiments are intended to facilitate understanding of the present invention and are not intended to limit the present invention thereto. Various changes and modifications can be made to the above embodiments without departing from the scope of the present invention.

The present invention is applicable to all gas sensors (sensor elements) of the type having an oxygen concentration detection cell equipped with a solid electrolyte body, a measurement electrode and a reference electrode. The present invention can be embodied not only as oxygen sensor (oxygen sensor element) as in the above embodiment, but also as NOx sensor (NOx sensor element) or any other gas sensor (sensor element). Although the gas sensor is provided with the single-cell type or two-cell type sensor element in the above embodiment, the number of cells in the sensor element is not particularly limited. The gas sensor may alternatively be provided as a three-cell type NOx sensor.

Figure 8:
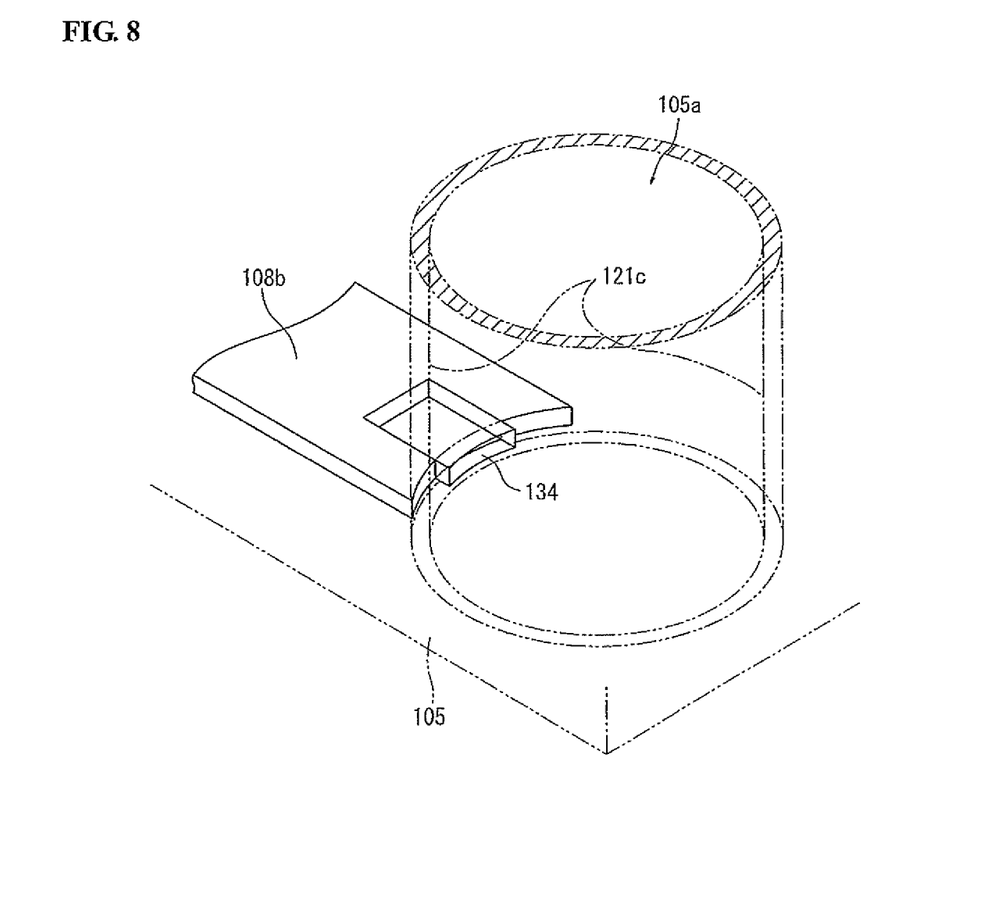
FIG. 8 is a perspective view of a ventilation portion of a sensor element according to a modification of the first or second embodiment of the present invention.

In the above embodiment, the ventilation portion 130, 132 is disposed between the reference lead 108b and the second substrate 103. As a modification of the above embodiment, there is provided a sensor element in which a ventilation portion 134 is flush with (arranged in the same plane as) the reference lead 108b as shown in FIG. 8. In other word, the ventilation portion 134 is arranged at any position between the solid electrolyte body 105 and the second substrate 103 and is not necessary disposed between the reference lead 108b and the second substrate 103.

In the modification example of FIG. 8, the ventilation portion 134 is in the form of a hollow space defined by a recess in a rear terminal end portion (through hole-side end portion) of the reference lead 108b. This hollow space 134 is formed to pass through the through hole conductor 121c and face the through hole 105a. The rear terminal end portion of the reference lead 108b is connected at an end surface thereof to the through hole conductor 121c.

FIGS. 9 and 10A to 10D are schematic views showing a method of manufacturing the sensor element with the ventilation portion 134. As in the case of the sensor element manufacturing method explained above with reference to FIGS. 5A to 5F, the green ceramic sheet 101x for formation of the protection layer 111 is stacked on the green solid electrolyte layer 105x; and the green ceramic sheets 101x and 103x for formation of the first and second substrates 101 and 103 are stacked together. However, the green ceramic sheets 111x and 101x are omitted from illustration in FIGS. 9 and 10A to 10D for the purpose of easy understanding.

Figure 9:
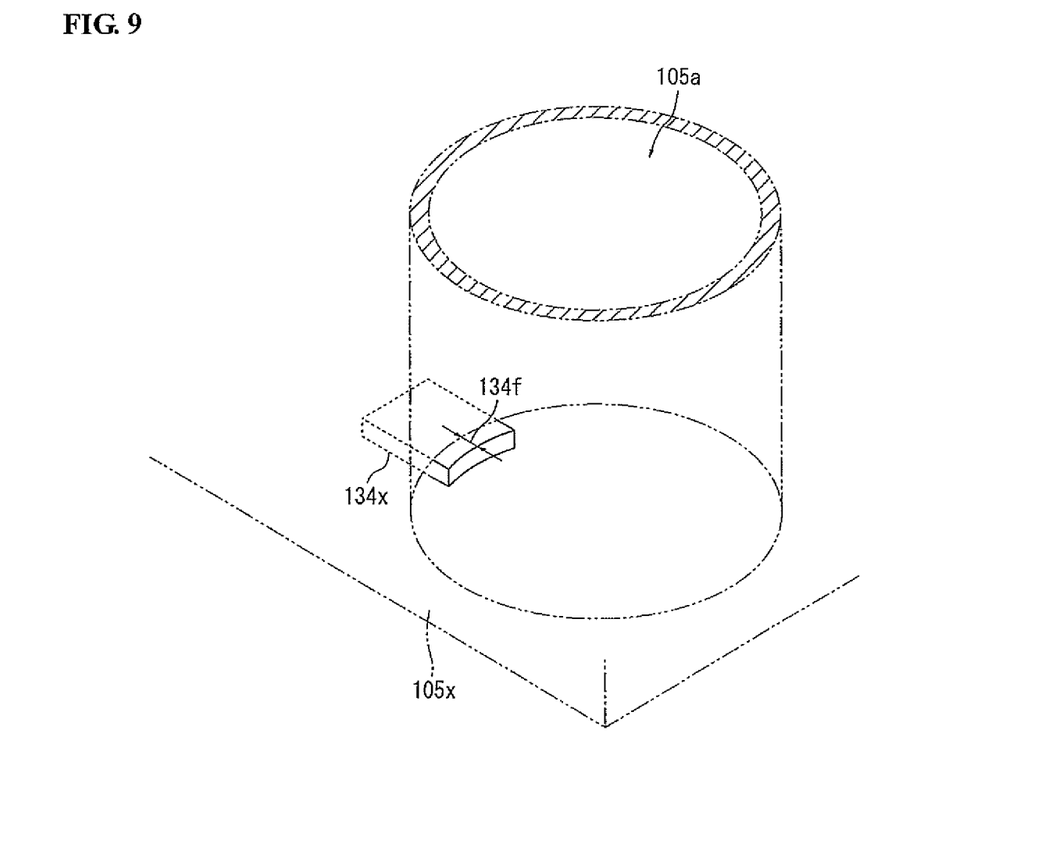
FIG. 9 is a perspective view showing a method of forming the ventilation portion of FIG. 8.
Figure 10A:
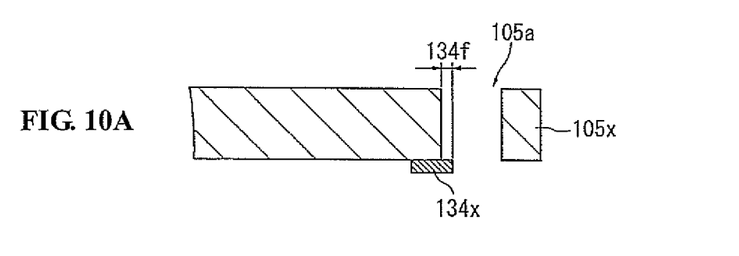
FIGS. 10A to 10D are schematic views showing the method of forming the ventilation portion of FIG. 8.

As shown in FIGS. 9 and 10A, a substantially rectangular sheet-shaped burn-off material 134x for formation of the hollow space 134 is bonded to one surface (lower side in FIGS. 9 and 10A) of the green solid electrolyte body 105x in the vicinity of the through hole 105a such that a protruding part 134f of the burn-off material 134x protrudes inside the through hole 105a so as to overlap the center of the rear terminal end of the reference lead 108b in the width direction. Herein, the protruding length of the protruding part 134f is set larger than at least the thickness of the through hole conductor 121c.

Figure 10B:
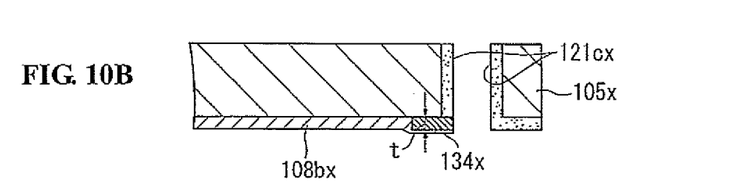

As shown in FIG. 10B, the green through hole conductor 121cx is formed along with the green lead 108bx in the same manner as in FIGS. 5B to 5D (green through hole conductor forming step and green lead forming step). At this time, the burn-off material 134x is embedded in the green through hole conductor 121cx and the green lead 108bx with the protruding part 134f protruding from the through hole conductor 121cx. The green through hole conductor 121cx extends to the green protection layer 111x side although not so shown due to the above-mentioned reason.

Figure 10C:
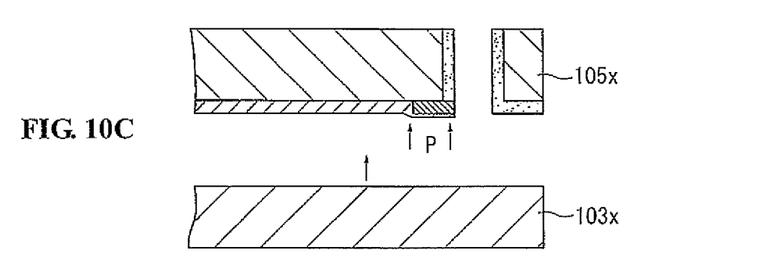

Then, the stacked assembly of the green first and second substrates 101x and 103x is stacked on the other surface of the green solid electrolyte body 105x such that the green second substrate 103x faces the solid electrolyte body 105x and covers at least the conductive paste 108bx (green lead) as shown in FIG. 10C (stacking step). Since parts of the green through hole conductor 121cx and the green lead 108bx overlapping the burn-off material 134x makes a contact P with the green second substrate 103x, the green through hole conductor 121cx and the green lead 108bx may be compressed and deformed by the green second substrate 103x. The green through hole conductor 121cx and the green lead 108bx are however prevented by the burn-off material 134x from being compressed and deformed to a smaller thickness than the burn-off material 134x because the burn-off material 134x is harder than these metal-containing green through hole conductor 121cx and lead 108bx. On the same plane as the burn-off material 134x, the green through hole conductor 121cx and the green lead 108bx are maintained at a thickness t so that the gas detection output of the sensor element does not become unstable due to variations in the oxygen permeability of the reference lead 108.

Figure 10D:
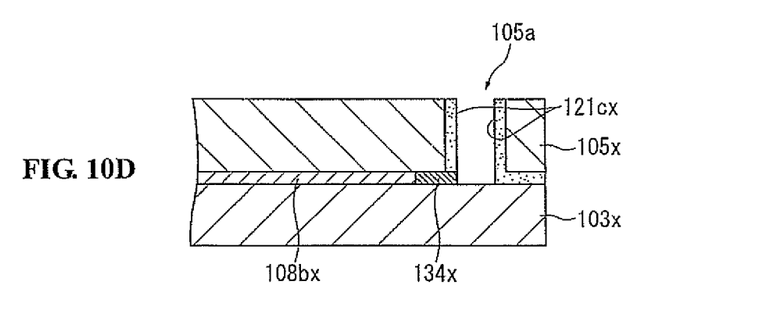

Finally, the whole of the thus-obtained stacked assembly (including the green lead 108bx and the green second substrate 103x) is fired as shown in FIG. 10D (firing step). During the firing step, the burn-off material 134x is burned off to form the hollow space 134. With this, the sensor element is completed as shown in FIG. 8.

Figure 11:
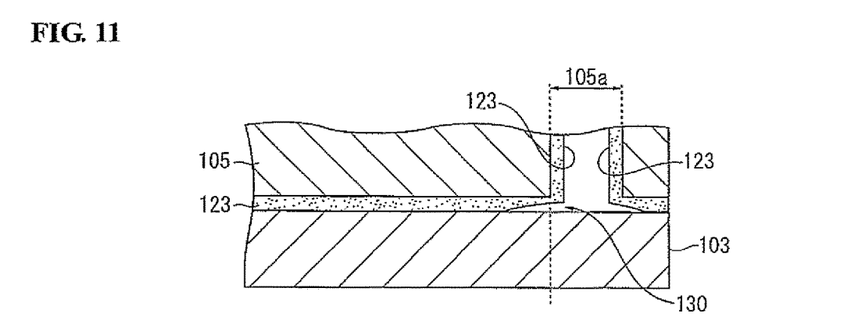
FIG. 11 is an enlarged cross-sectional view of part of a sensor element in which a through hole conductor and a reference lead are integrally formed of the same composition according to a modification of the first or second embodiment of the present invention.

As another modification of the above embodiment, there is provided a sensor element in which a through hole conductor 123 and a reference lead 123 are integrally formed of the same composition as shown in FIG. 11. In the modification example of FIG. 11, the green through hole conductor and the green lead are formed integral with each other in the same manner as mentioned above by e.g. simultaneously performing the green through hole conductor forming step and the green lead forming step. In the case where the through hole conductor 123 and the reference lead 123 are integrally formed of the same composition, an inner wall of the through hole 105a is defined corresponding to a boundary between the through hole conductor 123 and the reference lead 123 as indicated by a broken line in FIG. 11.

There are no particular limitation on the shape of the ventilation portion. There is also no particular limitation on the number of ventilation portions in the sensor element.

It is feasible to provide the burn-off material or the porous substance at any timing before the firing step. For example, the burn-off material or the porous substance may be provided before the through hole forming step as shown in FIG. 10A. In the case of using the porous substance as the ventilation portion, the porous substance is not necessarily limited to the pore-forming material, which is capable of being burned off during the firing step, and may alternatively be provided as a fired porous body and bonded to a part of the green solid electrolyte body 105x in the vicinity of the through hole 105a.

In the case of using the hollow space as the ventilation portion, the gas permeability of the ventilation portion becomes higher so that it is easier to discharge oxygen from the reference lead 108b through the ventilation portion. In the case of the porous substance as the ventilation portion, by contrast, the strength of the sensor element becomes higher than in the case of using the hollow space. Even though load is particularly exerted on a part of the sensor element in the vicinity of the through hole, the sensor element in which the porous substance is used as the ventilation portion shows improved strength against such load.

Although the green through hole conductor 121cx is provided after the stacking of the green solid electrolyte body 105x and the green protection layer 111x in the above embodiment, the green through hole conductor 121cx may alternatively be provided by forming respective green through hole conductors in the through hole 105a of the green solid electrolyte body 105x and in the through hole 101a of the green protection layer 111x and then stacking the green solid electrolyte body 105x and the green protection layer 111x together.

The entire contents of Japanese Patent Application No. 2018-034455 (filed on Feb. 28, 2018) are herein incorporated by reference. The scope of the present invention is defined with reference to the following claims.

What is claimed is:

1. A stacked-type sensor element having a plate shape extending in an axis direction thereof and comprising:
    a first ceramic layer;
    a pair of electrodes stacked on a front end part of the first ceramic layer, one of the pair of electrodes being a measurement electrode brought into contact with a gas under measurement to detect a specific gas component in the gas under measurement, the other of the pair of electrodes being a reference electrode brought into contact with a reference gas;
    a through hole formed through at least the first ceramic layer in a rear end side of the sensor element and extending in a stacking direction of the sensor element;
    a through hole conductor disposed on an inner wall of the through hole;
    a porous reference lead electrically connected to the reference electrode and directly connected to the through hole conductor; and
    a gas-impermeable second ceramic layer arranged facing one surface of the first ceramic layer on which the reference electrode is stacked and covering at least the porous reference lead,
    wherein the sensor element further comprises a ventilation portion provided between the first ceramic layer and the gas-impermeable second ceramic layer at a position facing and directly adjacent to the through hole and communicating with the porous reference lead, and
    wherein the ventilation portion is in the form of either a hollow space or a porous substance having a higher porosity than that of the porous reference lead.

2. A gas sensor, comprising: the stacked-type sensor element according to claim 1; and a metal shell holding therein the sensor element.

3. A manufacturing method of the stacked-type sensor element according to claim 1, comprising:
    forming a through hole through at least a green first ceramic layer in a rear end side of the sensor element such that the through hole extends in the stacking direction of the sensor element;
    forming a green through hole conductor on an inner wall of the through hole;
    forming a green lead on a reference electrode-side surface of the green first ceramic layer such that the green lead is electrically connected to the reference electrode and directly connected to the through hole conductor;
    stacking a green second ceramic layer on the reference electrode-side surface of the green first ceramic layer such that the green second ceramic layer covers at least the green lead; and
    firing the green lead, the green through hole conductor and the green first and second ceramic layers, thereby forming the green lead into the porous reference lead and forming the green second ceramic layer into the gas-impermeable second ceramic layer,
    wherein the manufacturing method further comprises, before the firing, providing a burn-off material or a porous substance between the green first ceramic layer and the green second ceramic layer at a position facing the through hole and communicating with the green lead, the burn-off material being a material capable of being burned off to form the hollow space during the firing step, the porous substance being higher in porosity than the reference lead.

4. The manufacturing method according to claim 3, wherein the green lead and the green through hole conductor are formed integral with each other in the same step.

* * * * *